United States Patent [19]

Scragg

[11] 4,137,932
[45] Feb. 6, 1979

[54] APPARATUS FOR DOSING A FLOWING FLUID

[76] Inventor: Edgar P. Scragg, 60 Mulder St., Florida Park Extension 3, Florida, Transvaal Province, South Africa

[21] Appl. No.: 774,575

[22] Filed: Mar. 4, 1977

[51] Int. Cl.$^2$ ............................................. G05D 11/00
[52] U.S. Cl. .............................. 137/101.11; 137/564.5; 222/105
[58] Field of Search .............. 137/101.11, 268, 564.5; 184/55 A; 239/310, 315, 328; 222/105, 92, 173, 183, 325, 326, 327, 394, 402.12, 541

[56] References Cited

U.S. PATENT DOCUMENTS

| 3,155,113 | 11/1964 | Germeshausen | 137/564.5 |
| 3,996,953 | 12/1976 | Scragg | 137/564.5 X |

Primary Examiner—William R. Cline
Attorney, Agent, or Firm—Ladas, Parry, Von Gehr, Goldsmith & Deschamps

[57] ABSTRACT

Apparatus for dosing a flowing fluid, particularly for dosing an airstream with lubricant. The apparatus includes a casing for connection into the fluid flow line and, within the casing, a cartridge with the additive therein. The cartridge comprises a bag and a nozzle, the nozzle including a metering bore and a spigot which closes the metering bore. Before the cartridge is placed in the casing for use, the spigot is removed so as to open the outlet end of the metering bore. The casing includes a cartridge plate having a stepped aperture therein, the step providing an axially facing shoulder, and the nozzle including a rib which inter-engages with said shoulder to locate the cartridge in the casing. There is a stop element in the bore which is positioned so that it is engaged by said spigot before the rib interengages with the shoulder if an operator attempts to push a nozzle into said bore without having removed the spigot. The preferred form of the stop element is a dished, disc with its concave side facing the nozzle and having a central aperture which exerts some metering influence on additive which has emerged through the metering bore of the nozzle.

6 Claims, 4 Drawing Figures

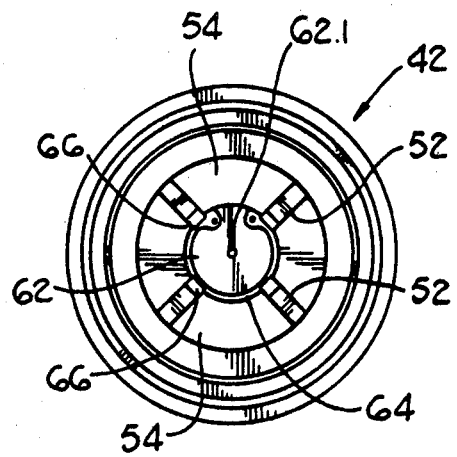
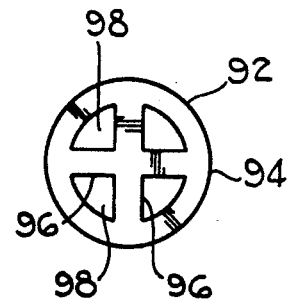
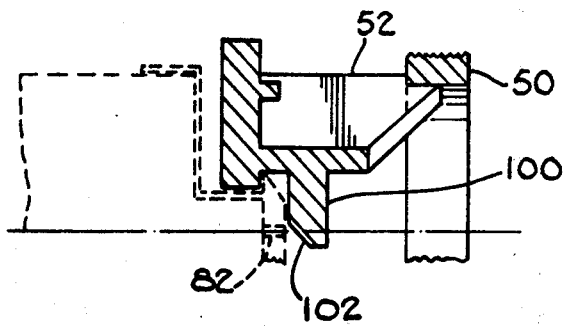

APPARATUS FOR DOSING A FLOWING FLUID

This invention relates to techniques for dosing a flowing fluid and has particular utility in the field of lubrication where a lubricant is to be added to a flowing airstream.

In my prior U.S. Pat. No. 3,724,601 there is disclosed a device which is primarily intended as a lubricator and which includes a casing for connection into a fluid flow line and a container or cartridge which contains the additive, generally lubricant, which is to be added to the flowing fluid, generally air.

Experience with lubricators of the type disclosed in the United States Patent referred to above has shown that they operate in an extremely satisfactory manner providing a substantially constant rate of lubrication virtually from the moment air commences to flow through the lubricator to the moment the cartridge is completely exhausted and has to be replaced. However, it has also been found that, in the form disclosed in the United States specification, it is possible for the type of relatively unskilled worker found in mines in many parts of the world to use the lubricator improperly.

Depending on the nature of the mistake made by the operator, or the form of abuse, two different problems arise. Firstly, the cartridge includes a spigot which must be cutoff to reveal the small bore through which metering of lubricant from the bag takes place. The operator can, in error, fail to remove this spigot so that the cartridge remains sealed with the result that the machine runs dry and can be damaged, possibly beyond repair, before it is even noticed that no lubrication is taking place.

Secondly, once the spigot has been removed, the bore which is revealed is of very small size. Some operators seem to be unable to believe that such a small bore was intended and take it upon themselves to increase the size of the bore by banging a nail or other sharp implement through the bore so that its size is increased to the point where the contents of the cartridge are expelled in far less time than would normally be required. Thus, for example, a desirable mode of use is to provide a rate of flow such that one cartridge will last for one shift. If the metering bore is tampered with as described then the cartridge is empty long before the end of the shift and, as a direct consequence, the machine being lubricated runs dry with consequent damage.

It is an object of the present invention to improve the lubricator of the above mentioned United States Patent in such a way as to reduce the risk of abuse or error in the use of the lubricator resulting in damage to the machine being lubricated.

According to the present invention there is provided apparatus for dosing a flowing fluid, the apparatus comprising:

(1) A casing having an inlet and an outlet by means of which the apparatus can be connected into a fluid flow line, a cartridge retaining plate having a bore therein bounded by a cylindrical wall, the bounding wall of said bore being stepped to provide an axially facing shoulder, and a stop element in said bore;

(ii) A cartridge for the additive with which the flowing fluid is to be dosed, the cartridge comprising a bag and a nozzle, the nozzle including a metering bore for connecting the interior of the bag with the exterior thereof, a removable spigot protruding from a face of the nozzle and closing-off said metering bore, said metering bore, once said spigot has been cutoff flush with said face, opening through said face, and a radially outwardly projecting rib for engaging said shoulder to retain the cartridge in position in the casing, the bag being of flexible material which is such that when a flowing fluid impinges thereon with sufficient force the bag progressively collapses to expel additive therefrom through said metering bore;

the spigot, unless removed, engaging said stop element before said rib engages with said shoulder to retain the cartridge in the casing.

With this form of apparatus, any attempt to push the cartridge into said bore so that the rib inter-engages with said shoulder without having previously removed the spigot results in the spigot encountering the stop element before the rib comes into co-operating relationship with said shoulder. Thus, instead of being secured in position, the cartridge, when released, merely drops out of the bore in the cartridge retaining plate.

In one constructional form, the stop element can be a finger protruding inwardly from said bounding wall. In a preferred constructional form said element is a dished, disc-like plate positioned transversely across said aperture. The plate can have a metering bore therein to limit the rate at which additive can be dispensed if the metering bore has been tampered with. Alternatively, the plate can be spider-like with apertures of substantial area which impose no significant restriction on the rate of flow of additive once it has emerged from said metering bore.

For a better understanding of the present invention reference will now be made, by way of example, to the accompanying drawings in which:

FIG. 2 is an end elevation of a cartridge plate of the lubricator of FIG. 1,

FIG. 3 illustrates a modified form of one component of the cartridge plate of FIG. 2, and FIG. 4 illustrates a further modified form of cartridge plate.

Figure 1:
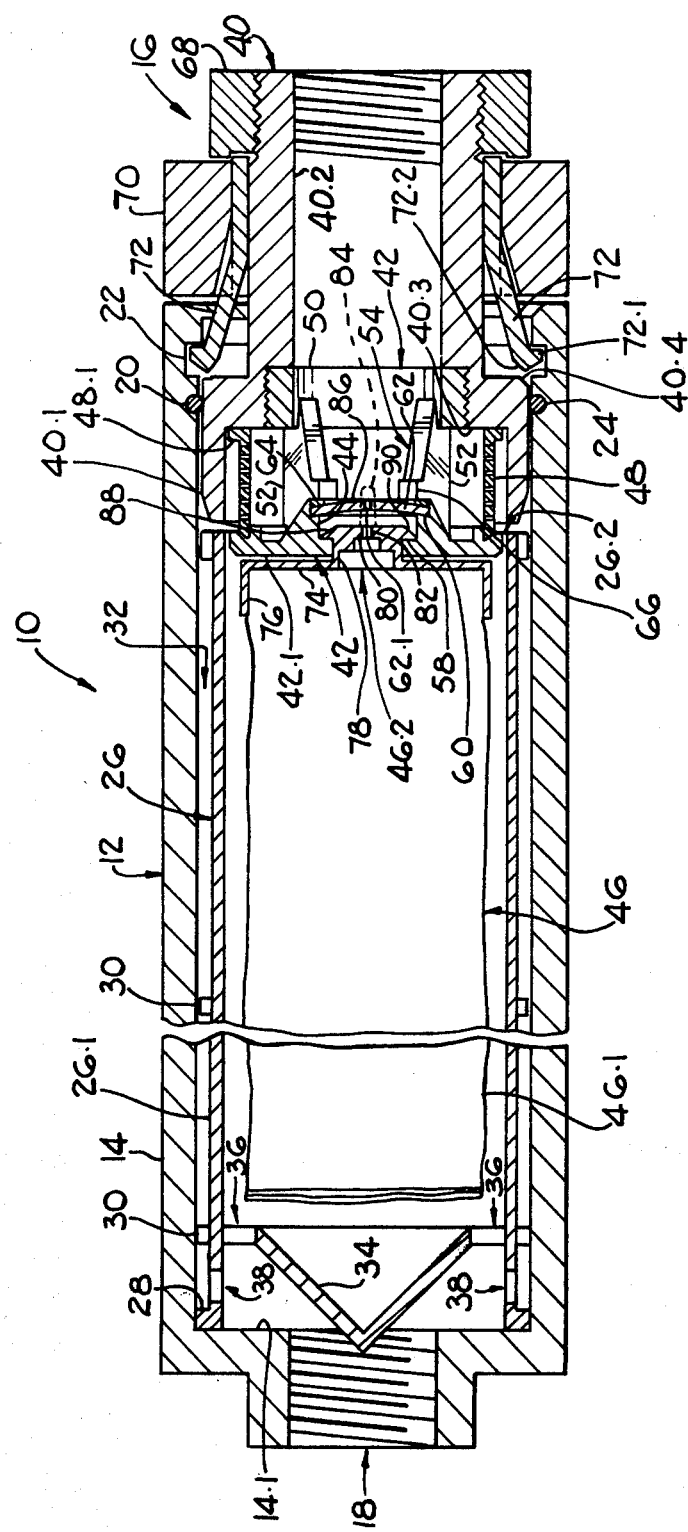
FIG. 1 is an axial section through a lubricator.

Referring firstly to FIG. 1, the lubricator illustrated is generally referenced 10 and includes a cylindrical outer casing 12 which is in two parts, a main part thereof being referenced 14 and a closure part thereof being referenced 16.

The main part 14 has one end thereof in the form of an internally threaded inlet 18 to which an airhose (not shown) can be connected. The other end of the main part 14 is open and two internal grooves 20 and 22 are formed adjacent this open end. The groove 20 serves to receive a seal 24 which can, as illustrated, be an O-ring and the groove 22 serves to receive locking elements as will be described in more detail hereinafter. A generally cylindrical liner 26 is fitted into the main part 14. The liner 26 includes an end ring 28 which is a tight-fit in the part 14 and which abuts the internal shoulder 14.1 of the part 14. Circumferential arrays of outwardly directed pads 30, in conjunction with the ring 28, centre the liner 26 in the bore of the part 14. By way of example, three arrays of pads 30 can be provided and each array of pads can consist of three pads, the pads being relatively short in the circumferential direction so that they are widely spaced apart in this direction and thus do not hinder fluid flow in the cylindrical space referenced 32 which exists between the outer surface of the liner 26 and the bore of the part 14.

At its lefthand end (as viewed in FIG. 1) the liner 26 includes a cone 34 the apex of which faces the inlet 18 and which almost completely closes that end of the generally cylindrical part 26.1 of the liner 26. The cone 34, as will be described, acts as a filter and a ring of apertures 36 is provided around the periphery of the cone to form the entrance to the interior of the liner. A further ring of apertures 38 in the part 26.1 places the inlet 18 in communication with the space 32.

Turning now to the closure part 16, this includes a main component 40 having a cylindrical sealing portion 40.1 at one end and an internally screw-threaded connector portion 40.2 at the other end. This connector portion 40.2 forms an outlet and is intended for attachment to an airhose, or directly to a pneumatic machine, and the portion 40.1 cooperates with the seal 24.

A cartridge retaining plate 42 having a central bore 44 for receiving a lubricant cartridge 46 is screwed into the lefthand end of the component 40. An air filter 48 of cylindrical form is held between a shoulder 40.3 of the component 40 and a disc-like portion 42.1 of the cartridge plate 42. It will be noted that the portion 42.1 enters the lefthand end of the liner 26 and substantially closes that end. Only a restricted circular exit 26.2 exists between the disc-like portion 42.1 and the liner part 26.1.

The air filter 48 is centred by its collar 48.1 and can consist of a cylinder in which a plurality of narrow, circumferentially extending cuts have been made. Each cut is interrupted in three or four places, the effect of this being to provide a filter which includes three or four longitudinally extending ribs which are connected to one another by a large number of circumferentially extending, closely spaced filter elements.

The cartridge plate 42 includes an externally threaded ring 50 which is screwed into the component 40. The ring 50 is connected to the disc-like portion 42.1 by four circumferentially spaced ribs 52 (see also FIG. 2). Between the ribs there are passages 54 which connect the space 32 to the outlet. It will be seen that the filter 48 is between the passages 54 and the space 32.

The central bore 44 of the cartridge plate 42 passes through the disc-like portion 42.1 and is stepped to provide two annular shoulders 58 and 60. The smaller diameter shoulder 58 co-operates with the cartridge 46 (as will be described in more detail hereinafter) and the larger diameter shoulder 60 forms a seat for a dished, circular plate 62. This plate is held in position by a Circlip 64 which is itself retained by radially inwardly directed protrusions 66 of the ribs 52. The protrusions 66 together define an aperture which has a diameter about equal to that of the plate 62. This aperture is, however, smaller in diameter than the Circlip 64 when the Circlip has sprung to its opened-out condition. Thus, to assemble the components just described the plate 62 is pressed into the bore 44 from the righthand side as illustrated in FIG. 1. The plate 62 deflects the protrusions 66 and eventually its periphery abuts the shoulder 60. The Circlip is then closed-up and inserted into the bore 44 so that it abuts the rear face of the plate 62, and then released so that it springs out beneath the four protrusions 66.

The plate 62 has a centrally located metering bore 62.1.

A retaining ring 68 is screwed onto the component 40 and holds a cam ring 70 and a plurality of locking fingers 72 in place. The ring 70 is formed internally with a number of cam surfaces which co-operate with corresponding cam surfaces on the fingers 72.

The free end 72.1 of each finger 72 is, in the position illustrated, in the groove 22. The fingers 72 are of a material such as nylon. The main casing part 14, the component 40, the cartridge plate 42, the air filter 48, the retaining ring 68 and the cam ring 70 can also be made of this material.

The component 40 is formed with a sloping, annular cam surface 40.4 which co-operates with a cam surface 72.2 formed on each finger 72 for a purpose to be described.

The finger 72 are, at their righthand ends, integral with a ring which encircles the component 40 between it and the cam ring 70.

The lubricant cartridge 46 includes a bag 46.1 which holds the lubricant and a nozzle 46.2 through which the lubricant feeds from the bag. The nature of the bag 46.1 will be dealt with subsequent to the description of the manner in which the lubricator operates. The lubricant can be a fluid or a particulate solid such as graphite or a grease.

The nozzle 46.2 comprises a disc 74 from the outer circular periphery of which protrudes a cylindrical flange 76. The bag 46.1 is secured to the flange 76 by, for example, heat sealing. At the centre of the disc 74, and on the side thereof remote from the flange 76, there is a hollow, projecting cylindrical portion 78. The righthand end of the cylindrical portion 78 is closed by a transverse wall 80 which has a metering bore 82 therein, the metering bore itself being closed by a spigot 84 which protrudes from the external face 86 of the wall 80. A rib 88 projects outwardly from the cylindrical portion 78. The rib 88 is bounded by a radially extending, annular rear surface and a sloping front surface 90 which intersects both the face 86 and the rear surface.

In use of the lubricator, the inlet 18 is connected to an air hose which itself leads to source of air (not shown) under pressure. The connector portion 40.2 is connected by a further airhose to, or is screwed directly onto, the pneumatic apparatus which is to be driven and lubricated. Such apparatus can be, for example, a pneumatic hammer or drill.

Relatively large dirt particles contained in the incoming air impinge on the cone 34, are guided by its sloping surface to the ring of apertures 36, and collect in the space which exists between the cone 34 and the lubricant bag 46.1. The bulk of the flowing air passes through the ring of apertures 38 into the space 32 and then through the air filter 48 to the passages 54. The air filter 48 removes the finer contaminating particles.

The flowing air impinges on the lefthand end of the bag 46.1 and the kinetic energy of the air slowly collapses the bag 46.1 so that the lubricant in the bag is squeezed through the metering bore 82 of the nozzle 46.2 and is entrained by the airstream. The position of the passages 54 is such that a venturi effect is created across the nozzle 46.2 and this in turn creates a low pressure area where lubricant emerges from the metering bore.

It will be noted that there is a tendency for the air flowing through the lubricator to urge the closure part 16 away from the main part 14. Separation of the parts 14 and 16 is prevented by the locking fingers 72. However, the component 40 does tend to move to the right (as illustrated in FIG. 1) and the effect of this is to cause the cam surface 40.4 to engage with the cam surfaces 72.2 and urge the free ends 72.1 of the fingers 72 more firmly into the groove 22.

Once the lubricant bag 46.1 is empty, the cam ring 70 is turned so that its internal cam surfaces co-operate with the cam surfaces of the fingers 72 and resiliently deform these fingers inwardly. The free ends 72.1 are thus disengaged from the groove 22 and the closure part 16, together with the lubricant cartridge 46, can be withdrawn from the main casing part 14. The liner 26 remains in the part 14 and dirt particles which have collected therein can be emptied out at this stage. It will be noted that the airhoses, if two are used, remain connected to the parts 14 and 16. If the portion 40.2 is screwed directly onto the machine then it remains so connected.

The used lubricant cartridge is then withdrawn from the bore 44 by pulling the entire cartridge to the left. This deforms the rib 88 so that its effective diameter decreases to less than that of the bore 44. Generally speaking, it is desirable for the cartridge 46 to be used once and then disposed of. However, it is possible to provide a grease nipple (for example mounted on the disc 74) and then the bag can be refilled either indefinitely or a few times until it deteriorates to the point of no longer being usable.

On the assumption that a fresh cartridge is to be employed, this has the spigot 84 still intact so that the metering bore 82 is closed. Using a cartridge only once has the advantage that, each time a new cartridge is inserted, a fresh metering bore 82 comes into use. If a cartridge is re-used then there is always the chance that a particle of dirt may block the metering bore 82 which will cause either a partial or complete lubrication failure.

On the assumption that a fresh cartridge is used, the spigot 84 is cut-off flush with the face 86 and thereafter the nozzle 46.2 is pushed into the bore 44. The rib 88 is deformed inwardly until it reaches the shoulder 58 whereupon it returns to its undeformed condition. Engagement between the shoulder 58 and the rear surface of the rib 88 prevents the cartridge being detached, other than deliberately, from the cartridge plate 42. The position of the face 86 in relation to the plate 62 is clearly illustrated in FIG. 1 and it will be seen that these two faces are relatively close together. Consequently, unless the spigot 84 is cut-off in the proper manner, the nozzle 46.2 cannot be pushed far enough into the bore 44 to cause inter-engagement between the rib 88 and the shoulder 58. Thus it is impossible to locate a cartridge 46 of which the spigot 84 has not been properly and entirely removed. The dishing of the plate 62 ensures that if its central metering aperture 62.1 and the metering bore 82 do not align exactly, it is impossible for face-to-face contact between the surface 86 and the concave face of the plate 62 to seal the metering bore 82. Even if the metering bore and metering aperture are mis-aligned, the metering bore 82 always opens into a space between the face 86 and the dished face of the plate 62 from which space the aperture 62.1 forms an exit.

It will also be understood that if the operator improperly widens the metering bore 82, the metering aperture 62.1 still exerts a metering action on the lubricant. Consequently, even if the metering bore is widened to the point where it is totally ineffective, the pneumatic machine will not be flooded with lubricant initially and starved thereafter.

In Applicant's opinion, the structure shown in FIG. 1 has one disadvantage which is that, in mines, the conditions are usually dusty. There is consequently the possibility that, while the lubricator is opened to permit a cartridge 46 to be replaced, a particle of dirt might settle in the metering aperture 62.1 and thereby block-off lubricant flow to the pneumatic machine. This can be avoided by using one or other of the structures shown in FIGS. 3 and 4. In FIG. 3, the plate 92 is shown as being spider-like and comprising a peripheral ring 94 and two intersecting cross bars 96. These cross bars leave four apertures 98 of substantial area therebetween. The cross-bars 96 are dished to prevent the central portion of the cross being able to contact the front face 86 and seal-off the metering bore 82.

The structure shown in FIG. 3 functions to prevent a nozzle 46.2 being inserted in the bore 44 without the spigot 84 properly removed. Furthermore, the metering aperture 62.1 is no longer included but is replaced by the four large area apertures 98. It will be understood, of course, that with a plate 62 as illustrated in FIG. 3, widening of the metering bore 82 will not be countered by metering at the plate 62.

In FIG. 4 there is shown a modified cartridge plate which includes a projection 100 extending inwardly from the wall of the bore 44. It will be seen that the face 102 of the projection 100 is angled thereby to prevent the metering bore 82 being closed-off by the projection 100.

The plate 62 could, of course, be moulded integrally with the cartridge plate 42 instead of being a separate component. However, the necessity of providing the shoulder 58 to retain the cartridge makes the moulding extremely complex in construction and, consequently, expensive.

The nozzle 46.2 is preferably a moulding of synthetic plastics material. The bag 46.1 can also be of synthetic plastics material, the requirements for this material being that it is flexible, impervious to the lubricant contained therein and which, preferably, does not have any significant inherent resilience. The flexibility of the material of the bag enables it to collapse progressively under the influence of the air (or other fluid) which impinges thereon with sufficient force. Where a bag of sheet plastics material is used, the end remote from the nozzle 46.2 can be closed by means of a transverse weld.

I claim:

1. Apparatus for dosing a flowing fluid, the apparatus comprising
   (i) A casing having an inlet and an outlet by means of which the apparatus can be connected into a fluid flow line, a cartridge retaining plate having a bore therein bounded by a cylindrical surface, the bounding surface of said bore being stepped to provide a larger diameter bore portion and a smaller diameter bore portion with an axially facing shoulder therebetween, and a stop element in said larger diameter bore portion;
   (ii) A cartridge for the additive with which the flowing fluid is to be dosed, the cartridge comprising a bag and a nozzle, the nozzle including a metering bore for connecting the interior of the bag with the exterior thereof, a removable spigot protruding from a face of the nozzle and closing-off said metering bore, said metering bore, once said spigot has been cutoff flush with said face, opening through said face, and a radially outwardly projecting rib for engaging said shoulder to resist movement of the cartridge, once it is in position in the casing, in the direction away from the stop element, the bag being of flexible material which is such that when a flowing fluid impinges thereon with sufficient force the bag progressively collapses to expel additive therefrom through said metering bore, the distance between said face and the stop element, when the cartridge is in position in the casing, being less than the length of the spigot measured from its tip to said face.

2. Apparatus according to claim 1 in which said stop element is finger-like and protrudes inwardly from said bounding wall.

3. Apparatus according to claim 1, in which said element is constituted by an apertured, dished plate arranged transversely across said bore with its concave face directed towards said nozzle.

4. Apparatus according to claim 3 in which the dished plate has a centrally positioned aperture for metering additive therethrough.

5. Apparatus according to claim 3 in which the dished plate is in the form of a spider having a peripheral ring and a central portion with radially extending bars connecting said peripheral ring to said central portion.

6. Apparatus for dosing a flowing fluid with an additive, the apparatus comprising a casing having an inlet and an outlet by means of which the apparatus can be connected into a fluid flow line, the casing including two parts which can be separated to provide access to the interior thereof, a cartridge retaining plate having a bore bounded by a cylindrical surface, the bounding surface of said bore being stepped twice to provide a larger diameter bore portion, a smaller diameter bore portion and an intermediate diameter bore portion between the other two bore portions with an axially facing shoulder between the larger and intermediate diameter bore portions and a further axially facing shoulder between the intermediate and smaller diameter bore portions, and a stop element extending transversely of said bore in said larger diameter bore portion for preventing free passage along said bore of the nozzle of a cartridge containing said additive.

* * * * *